United States Patent [19]

Cheng

[11] 4,409,136

[45] Oct. 11, 1983

[54] MOLECULAR SIEVE ZEOLITE-BUILT DETERGENT PASTE

[75] Inventor: Bao-ding Cheng, Kendall Park, N.J.

[73] Assignee: Colgate Palmolive Company, New York, N.Y.

[21] Appl. No.: 371,261

[22] Filed: Apr. 23, 1982

Related U.S. Application Data

[60] Division of Ser. No. 764,145, Jan. 31, 1977, abandoned, which is a continuation of Ser. No. 503,745, Sep. 6, 1974, abandoned.

[51] Int. Cl.[3] .......................... C02F 1/42; C11D 1/83; C11D 3/12; C11D 17/08

[52] U.S. Cl. .................................... 252/540; 252/140; 252/173; 252/174.21; 252/174.25; 252/179; 252/DIG. 14

[58] Field of Search ........... 252/131, 140, 173, 174.21, 252/174.25, 179, 540

[56] References Cited

U.S. PATENT DOCUMENTS

| | | | |
|---|---|---|---|
| 3,574,120 | 4/1971 | Siebert | 252/132 |
| 3,619,119 | 11/1971 | Felletschin | 8/137 |
| 3,755,180 | 8/1973 | Austin | 252/99 |
| 3,812,041 | 5/1974 | Inamorato | 252/89.1 |
| 3,849,347 | 11/1974 | Tokiwa | 252/545 |
| 3,929,678 | 12/1975 | Laughlin | 252/526 |
| 3,985,669 | 10/1976 | Krummel | 252/116 |
| 4,274,975 | 6/1981 | Corkill | 252/140 |

FOREIGN PATENT DOCUMENTS

| | | | |
|---|---|---|---|
| 2433485 | 2/1975 | Fed. Rep. of Germany | 252/131 |
| 1473201 | 5/1977 | United Kingdom | 252/131 |

OTHER PUBLICATIONS

Savitsky, A. C.: "Type A Zeolite as a Laundry Detergent Builder", H.A.P.P.I., Mar. 1977, pp. 52, 56, 58 & 66.

Huber: "Comparison of Various Base Exchange Products" Data sheet of J. M. Huber Corp., publication date unknown.

*Primary Examiner*—Dennis L. Albrecht

[57] ABSTRACT

A stable homogeneous paste detergent is provided comprising about 24% of a synthetic nonionic detergent, about 8% of sodium silicate, about 24% of a type A zeolite, about 0.2% of sodium carboxymethyl cellulose, about 34.7% of deionized water and about 9.1% of a synthetic anionic detergent.

1 Claim, No Drawings

MOLECULAR SIEVE ZEOLITE-BUILT DETERGENT PASTE

This is a divisional of application Ser. No. 764,145, filed Jan. 31, 1977, now abandoned, which is a continuation of application Ser. No. 503,745, filed Sept. 6, 1974, now abandoned.

This invention relates to aqueous paste detergent compositions. More particularly, it relates to such pastes which contain water insoluble molecular sieve zeolites.

Some of the physical disadvantages of solid detergent compositions such as particulate detergents, have resulted in a preference of some consumers for aqueous liquid detergents. Particulate detergents are often prepared by drying, e.g., spray drying, an aqueous mixture of detergent ingredients. During such drying volatile constituents of the detergent formulation may vaporize, resulting in serious atmospheric pollution and economic loss. Liquid detergents require no substantial drying and their preparation avoids this detriment. Furthermore, because of their fluidity, liquid detergents can be measured or metered out in required amounts in automatic washing operations with greater facility than solid detergents. However, a disadvantage of liquid detergents is the difficulty of preparing a homogeneous liquid detergent containing a water-insoluble ingredient such as an insoluble detergency builder. Attempts to disperse particulate, insoluble components in a liquid detergent have often resulted in the eventual settling out of the insoluble material. The resultant two-phase mixture may be rejected by consumers as unsightly despite the fact that the insoluble material may often be redispersed in the liquid by agitation or mild shaking.

The aforementioned disadvantages of prior art solid and liquid detergents are overcome by the novel detergent product of the present invention, which is a stable homogenous paste detergent composition usually comprising 5 to 50% of a water soluble synthetic organic detergent, 5 to 60% of a particulate water insoluble molecular sieve zeolite, usually gasfree and in univalent cation-exchanging form and 10 to 70% of an aqueous medium.

Preferably, the novel paste detergent contains 15 to 35% by weight of the organic detergent, 20 to 35% of the water insoluble molecular sieve and 25 to 50% of aqueous medium. Preferably also the detergent paste contains 5 to 35%, preferably 8 to 20% of a water soluble builder.

The novel paste of the invention can be made by combining the surfactant, the zeolite molecular sieve and the aqueous medium and stirring, shaking or agitating the mixture for about 1 to 15 minutes, advantageously for about 1 to 5 minutes. Generally the agitation of the aqueous mixture can be effected at a temperature in the range of 10° to 80° C., preferably 1° to 50° C. but most preferably the mixing operation is carried out at about ambient temperature, e.g., 15° to 35° C. Advantageously an electric blender, a dough mixer, a soap crutcher, a homogenizer or equivalent agitation device may be used to prepare the paste.

The detergent paste of the invention is an aqueous fluid or gel wherein the insoluble molecular sieve is homogeneously dispersed. It may be in cake form and can be of a viscosity in the range from thin gel to thick paste. The insoluble builder does not settle out to produce a unsightly sediment. Because of its capability of being extruded or "liquified" the paste can be metered or measured out in washing operations with a facility comparable to that of prior art liquid detergents and hence may be referred to as "fluid". Additionally, the paste detergent is prepared without extensive drying or evaporation operations, thereby avoiding the pollution hazards and losses sometimes associated with the manufacture of particulate detergents. Also, compared to the mixing of powders without drying, dusting is prevented.

The molecular sieves utilized in the invention are water insoluble crystalline aluminosilicate zeolites of natural or synthetic origin which are characterized by having a network of uniformly sized pores in the range of about 3 to 10 Angstroms, preferably about 4 Å (nominal), which size is uniquely determined by the unit structure of the zeolite crystal. Of course, zeolites containing two or more such networks of different size pores can also be employed.

The molecular sieve zeolite should also be univalent cation-exchanging zeolite, i.e., it should be an aluminosilicate of a univalent cation such as sodium, potassium, lithium, when practicable or other alkali metal, ammonium or hydrogen. Preferably, the univalent cation associated with the zeolite molecular sieve is an alkali metal cation, especially sodium or potassium.

Crystalline types of zeolites utilizable as molecular sieves in the invention, at least in part, include zeolites of the following crystal structure groups: A, X, Y, L, mordenite, and erionite. Mixtures of such molecular sieve zeolites can also be useful, especially when type A zeolite is present. These preferred crystalline types of zeolites are well known in the art and are more particularly described in the text *Zeolite Molecular Sieves* by Donald W. Breck, published in 1974 by John Wiley & Sons. Typical commercially available zeolites of the aforementioned structural types are listed in Table 9.6 at pages 747–749 of the Breck text, which table is incorporated herein by reference.

Preferably the molecular sieve zeolite used in the invention is a synthetic molecular sieve zeolite. It is also preferable that it be of type A crystalline structure, more particularly described at page 133 of the aforementioned text. An especially good result is generally obtained in accordance with the invention when a Type 4A molecular sieve zeolite is employed, wherein the univalent cation of the zeolite is sodium and the pore size of the zeolite is about 4 Angstroms. The especially preferred zeolite molecular sieves are described in U.S. Pat. No. 2,882,243 which refers to them as Zeolite A.

Molecular sieve zeolites can be prepared in either a dehydrated or calcined form which contains from less than about 1.5% to about 3% of moisture or in a hydrated or water loaded form which contains additional adsorbed water in an amount up to about 36% of the zeolite total weight, depending on the type of zeolite used. Preferably, the water-containing hydrated form of the molecular sieve zeolite is employed in the practice of the invention. The manufacture of such crystals is well known in the art. For example, in the preparation of Zeolite A referred to above, the hydrated zeolite crystals that are formed in the crystallization medium (such as a hydrous amorphous sodium aluminisilicate gel) are used without the high temperature dehydration (calcining to 3% or less water content) that is normally practiced in preparing such crystals for use as catalysts, e.g., cracking catalysts. The preferred form of zeolite in either completed hydrated or partially hydrated form can be recovered by filtering off the crystals from the crystallization medium and drying them in air at ambient temperature so that their water content is in the range of about 20 to 28.5%, preferably about 20 to 22%.

The crystalline zeolites used as molecular sieves should also be substantially free of adsorbed gases, such as carbon dioxide, since such gas-containing zeolites can produce undesirable foaming when the zeolite-containing detergent is contacted with water; however, sometimes the foaming is tolerated.

Preferably the molecular sieve zeolite should be in finely divided condition such as crystals (amorphous or poorly crystalline particles may also find some use) having mean particle diameters in the range of about 0.5 to about 12 microns, preferably 5 to 9 microns and especially about 5.9 to 8.3 microns, mean particle size, e.g., 6.4 to 8.3 microns.

The water soluble organic detergent which is employed in the detergent paste can be selected from any of the principal classes of such detergents, i.e., it can be selected from anionic, nonionic, cationic and amphoteric detergents. These categories of water soluble synthetic organic detergents are more particularly described in McCutcheon's *Detergents and Emulsifiers*, 1969 Annual and by Schwartz, Perry and Berch in *Surface Active Agents*, Vol. II (Interscience Publishers, 1958).

Suitable anionic water soluble surfactants include higher (10 to 20 or 12 to 18 carbon atom alkyl benzene sulfonate salts, preferably linear alkyl benzene sulfonates wherein the alkyl group contains 10 to 16 carbon atoms. The alkyl group is preferably linear and especially preferred are those of average alkyl chain lengths of about 11 to 13 or 14 carbon atoms.

Preferably also, the alkyl benzene sulfonate has a high content of 3- (or higher) phenyl isomers and a correspondingly low content (well below 50%) of 2- (or lower) phenyl isomers; in other terminology, the benzene ring is preferably attached in large part at the 3 or higher (e.g., 4, 5, 6 or 7) position of the alkyl group and the content of isomers in which the benzene ring is attached at the 2 or 1 position is correspondingly low. One suitable type of such detergent is described in U.S. Pat. No. 3,320,174.

Also, typical of the useful anionic detergents are the olefin sulfonate salts. Generally they contain long chain alkenyl sulfonates or long chain hydroxyalkane sulfonates (with the OH being on a carbon atom which is not directly attached to the carbon atom bearing the —$SO_3$ group). More usually, the olefin sulfonate detergent comprises a mixture of these two types of compounds in varying amounts, often together with long chain disulfonates or sulfate-sulfonates. Such olefin sulfonates are described in many patents, such as U.S. Pat. Nos. 2,061,618; 3,409,637; 3,332,880; 3,420,875; 3,428,654; 3,506,580; and British Pat. No. 1,139,158, and in the article by Baumann et al. in Fette-Seifen-Anstrichmittel, Vol. 72, No. 4, at pages 247–253 (1970). All the abovementioned disclosures are incorporated herein by reference. As indicated in these patents and the published literature, the olfein sulfonates may be made from straight chain alpha-olefins, internal olefins, olefins in which the unsaturation is in a vinylidene side chain (e.g., dimers of alpha-olefin), etc., or, more usually, mixtures of such compounds, with the alpha-olefin usually being the major constituent. The sulfonation is usually carried out with sulfur trioxide under low partial pressure, e.g., $SO_3$ highly diluted with inert gas such as air or nitrogen or under vacuum. This reaction generally yields an alkenyl sulfonic acid, often together with a sultone. The resulting acidic material is generally then made alkaline and treated to open the sultone ring to form hydroxyalkane sulfonate and alkenyl sulfonate. The number of carbon atoms in the olefin is usually within the range of 10 to 25, more commonly 12 to 20, e.g., a mixture of principally $C_{12}$, $C_{14}$ and $C_{16}$, having an average of about 14 carbon atoms or a mixture of principally $C_{14}$, $C_{16}$ and $C_{18}$, having an average of about 16 carbon atoms.

Another class of water soluble synthetic organic anionic detergents includes the higher (10 to 20 carbon atoms) paraffin sulfonates. These may be the primary paraffin sulfonates made by reacting long chain alpha-olefins and bisulfite, e.g., sodium bisulfite, or paraffin sulfonates having the sulfonate groups distributed along the paraffin chain, such as the products made by reacting a long chain paraffin with sulfur dioxide and oxygen under ultraviolet light, followed by neutralization with NaOH or other suitable base (as in U.S. Pat. Nos. 2,503,280; 2,507,088; 3,260,741; 3,372,188; and German Patent 735,096). The hydrocarbon substituent of the paraffin sulfonate preferably contains 13 to 17 carbon atoms and the paraffin sulfonate will normally be a monosulfonate but, if desired, may be a di-, tri- or higher sulfonate. Typically, a paraffin disulfonate may be employed in admixture with the corresponding monosulfonate, for example, as a mixture of mono- and di-sulfonates containing up to about 30% of the disulfonate.

The hydrocarbon substituent of the paraffin sulfonate will usually be linear but branched chain paraffin sulfonates can be also employed. The paraffin sulfonate used may be terminally sulfonated or the sulfonate substituent may be joined to the 2-carbon or other carbon atom of the chain. Similarly, any di- or higher sulfonate employed may have the sulfonate groups distributed over different carbons of the hydrocarbon chain.

Other anionic detergents that can be used are the water soluble salts or soaps of, for example, such higher fatty carboxylic acids as lauric, myristic, stearic, oleic, elaidic, isostearic, palmitic, undecylenic, tridecylenic, pentadecylenic, 2-lower alkyl higher alkanoic (such as 2-methyl tridecanoic, 2-methyl pentadecanoic or 2-methyl heptadecanoic) or other saturated or unsaturated fatty acids of 10 to 20 carbon atoms, preferably of 12 to 18 carbon atoms. Soaps of dicarboxylic acids may also be used, such as the soaps of dimerized linoleic acid. Soaps of such other higher molecular weight acids as rosin or tall oil acids, e.g., abietic acid, may be employed. One specific suitable soap is the soap of a mixture of tallow fatty acids and coconut oil fatty acids (e.g., in 85:15 ratio). For the purpose of this specification the soaps will be considered in the class of synthetic detergents.

Other anionic detergents are sulfates of higher alcohols, such as sodium lauryl sulfate, sodium tallow alcohol sulfate, sulfated oils, or sulfates of mono- and diglycerides of higher fatty acids, e.g., stearic monoglyceride monosulfate; higher alkyl poly (lower alkenoxy) ether sulfates, i.e., the sulfates of the condensation products of a lower (2 to 4 carbon atoms) alkylene oxide, e.g., ethylene oxide, and a higher aliphatic alcohol, e.g., laury alcohol, wherein the molar proportion of alkylene oxide to alcohol is from 1:1 to 5:1; lauryl or other higher alkyl glyceryl ether sulfonates; aromatic poly-(lower alkenoxy) ether sulfates such as the sulfates of the condensation products of ethylene oxide and nonyl phenol (usually having 1 to 20 oxyethylene groups per molecule and preferably, 2 to 12). The ether sulfate may also be one having a lower alkoxy (of 1 to 4 carbon atoms, e.g., methoxy), substituent on a carbon close to that carrying the sulfate group, such as a monomethyl ether monosulfate of a long chain vicinal glycol, e.g., a mixture of vicinal alkane diols of 16 or 17 to 18 or 20 carbon atoms in a straight chain.

Additional water soluble anionic surfactants include the higher acyl sarcosinates (e.g., sodium lauroyl sarcosinate) the acyl esters, e.g., oleic acid ester, of isethionates and acyl N-methyl taurides, e.g., potassium N-methyl lauroyl- or oleyl taurides. Another type of anionic surfactant is a higher alkyl phenol sulfonate, for example, a higher alkyl phenol disulfonate, such as one having an alkyl group of 12 to 25 carbon atoms, preferably a linear alkyl of about 16 to 22 carbon atoms, which may be made by sulfonating the corresponding alkyl phenol to a product containing in excess of 1.6, preferably above 1.8, e.g., 1.8 to 1.9 or 1.95 $SO_3H$ groups per alkyl phenol molecule. The disulfonate may be one whose phenolic hydroxyl group is blocked, as by etherification or esterification; thus the H of the phenolic OH may be replaced by an alkyl, e.g., ethyl or hydroxyalkoxyalkyl, e.g., a $-(CH_2CH_2O)_xH$ group in which x is 1 or more, such as 3, 6 or 10, and the resulting alcoholic OH may be esterified to form, say, a sulfate, e.g., $-SO_3Na$.

While the aforementioned structural types of organic carboxylates, sulfates and sulfonates are generally preferred, the corresponding organic phosphates and phosphonates are also useful as anionic detergents.

Generally, the anionic detergents are salts of alkali metals, such as potassium and especially sodium, although salts of ammonium cations and substituted ammonium cations derived from lower (2 to 4 carbon atoms) alkanolamines, e.g., triethanolamine, tripropanolamine, diethanol monopropanolamine, and from lower (1 to 4 carbon atoms) alkylamines, e.g., methylamine, ethylamine, sec-butylamine, dimethylamine, tripropylamine and tri-isopropylamine, may also be utilized.

Of the anionic detergents the alkali metal salts of sulfated and sulfonated oleophilic moieties are preferred over the carboxylic, phosphoric and phosphonic compounds.

The nonionic surfactants having the most desirable detergency properties are usually viscous, liquids or unctuous pasty or tacky solids at room temperature, such as those having melting points below about 40° C. and having significant volatility or fuming properties under conditions, e.g., spray drying, used commercially to dry particulate detergents. Typical nonionic detergents are poly-(lower alkenoxy) derivatives that are usually prepared by the condensation of a lower (2 to 4 carbon atom) alkylene oxide, e.g., ethylene oxide, propylene oxide, to compounds having a hydrophobic hydrocarbon chain and containing one or more active hydrogen atoms, such as higher alkylphenols, higher fatty alcohols, higher fatty acids, higher fatty mercaptans, higher fatty amines, and higher fatty polyols and alcohols, e.g., fatty alcohols having 8 to 20 carbon atoms in an alkyl chain and alkoxylated with an average of about 3 to 30 lower alkylene oxide units.

Preferred nonionic surfactants are those represented by the formula:

$$RO(C_2H_4O)_nH,$$

wherein R represents the residue of a linear saturated primary alcohol (an alkyl) of 12 to 18 carbon atoms and n is an integer from 6 to 20.

Typical commercial nonionic surfactants suitable for use in the invention include Neodol 45-11, which is an ethoxylation product (having an average of 11 ethylene oxide units) of a 14 to 15 carbon atom chain fatty alcohol (Shell Chemical Company); Neodol 25-7, a 12 to 15 carbon atom chain fatty alcohol ethoxylated with an average of 7 ethylene oxide units; and Alfonic 1618-65, which is a 16 to 18 carbon alkanol ethoxylated with an average of 10 to 11 ethylene oxide units (Continental Oil Company). Also useful are the Igepals of GAF Co., Inc.

Cationic organic surfactants include quaternary amines having a water soluble anion such such as acetate, sulfate or chloride. Suitable quaternary ammonium salts may be derived from a higher fatty primary amine by condensation with a lower alkylene oxide similar to that described above for preparation of nonionic surfactants. Typical cationic surfactants of this type include Ethoduomeens T/12 and T/13, which are ethylene oxide condensates of N-tallow trimethylene diamine (Armour Industrial Chemical Co.) and Ethoquad 18/12, 18/25 and 0/12 which are polyethoxylated quaternary ammonium chlorides (Armour Industrial Chemical Co.). Cationic surfactants also include quaternary ammonium salts derived from heterocyclic aromatic amines such as Emcol E-607 which is N-(lauryl colamino formyl methyl) pyridinium chloride (Witco Chemical Corp.). Also sometimes classified as cationic surfactants are higher fatty amine oxides such as Aromox 18/12 which is bis(2-hydroxyethyl) octadecylamine oxide (Armour Industrial Chemical Co.).

Amphoteric organic surfactants are generally higher fatty carboxylates, phosphates, sulfates or sulfonates which contain a cation substituent such as an amino group which may be quaternized, for example, with a lower alkyl group, or may have the chain thereof extended at the amino group by condensation with a lower alkylene oxide, e.g., ethylene oxide. In some instances the amino group may be a member of a heterocyclic ring. Representative commercial water soluble amphoteric organic detergents include Deriphat 151, which is sodium N-coco betaaminopropionate (General Mills, Inc.) and Miranol C2M (anhydrous acid), which is the anhydrous form of the heterocyclic diaminodicarboxylic compound of the formula

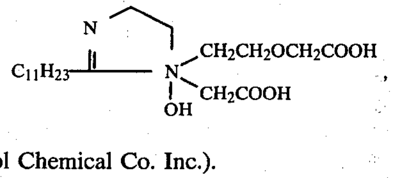

(Miranol Chemical Co. Inc.).

The water soluble organic detergent employed in the detergent paste of the invention preferably includes a nonionic surfactant and of the nonionics it is especially preferred to employ a polyalkoxylated higher fatty alcohol of the formula previously presented. The detergent paste may preferably contain several different types of water soluble detergents. For example, when the principal detergent is nonionic there is often desirably present an anionic detergent, such as a sulfate or sulfonate, which is in a proportion up to about 25%, e.g., 2 to 25%, preferably about 5 to 12%, based on the weight of the paste. Use of a water soluble linear higher alkyl benzene sulfonate, such as the sodium salt, as the anionic detergent is especially preferred. In such combinations of anionic and nonionic detergents, especially when the ratio of anionic:nonionic is in the range of 0.3 to 1 or 0.5 to 1, rather than less than 0.3, the presence of the anionic detergent makes the product creamier, less likely to dry out on storage (6 months) and more effective in washing out mixed soils on laundering.

The solvent or fluid medium for the present paste detergent is an aqueous one. It may be water alone or may be substantially water with additional solvents added to solubilize particular ingredients. Because of the availability of water and its minimum cost, it is preferred to use it as the sole solvent present. Yet, amounts of other solvents, usually in proportions from about 0 or 0.1 to 20%, preferably totaling about 5 to 15% of the detergent paste, may be present. Generally, such a supplemental fluid or solvent is a lower aliphatic alcohol (including the mono-, di- and polyhydric alcohols, such as alkanols, diols and triols, as well as ether alcohols and polyols), e.g., methanol, ethanol, n-propanol, isopropanol, n-butanol, ethylene glycol, propylene glycol, glycerol, diethylene glycol. In this connection, ethanol is especially preferable.

The water utilized in preparing the present paste detergent may be tap water but is preferably deionized water.

The water insoluble molecular sieve zeolite present in the detergent pastes has an excellent building effect on the detergency of the paste. However, the paste preferably also contains a water soluble builder salt or a mixture of such salts. The water soluble builder salt may be either an organic or inorganic builder salt. Representative organic builder salts include the water soluble, such as alkali metal and especially sodium salts of nitrilotriacetic acid, citric acid, 2-hydroxyethylene iminodicarboxylic acid, boroglucoheptanoic acid, polycarboxylic acids, e.g., polymaleates of low molecular weight (generally below 1,000, e.g., 400, 600, or 800), and polyphosphonic acids. Normally one will prefer to avoid using phosphorus-containing compounds.

Representative inorganic builders which may be incorporated in the paste with the molecular sieve zeolite, alone or in mixture, are water soluble silicates, e.g., alkali metal silicates wherein the molar ratio of metal oxide to $SiO_2$ is about 1:1.5 to 1:3.2, alkali metal polyphosphate salts, such as pentasodium tripolyphosphate and tetrasodium pyrophosphate and alkali metal carbonates such as sodium carbonate.

The supplemental water soluble builder is preferably an inorganic salt and more preferably a non-phosphate builder, e.g., a water soluble silicate. Particularly good results are obtained with alkali metal silicates such as sodium silicate. Preferably, the molar ratio of $Na_2O$ to silica in the silicate builder is about 1:2 to 1:2.5.

The concentration of supplemental water soluble builder incorporated in the detergent paste according to a preferred embodiment of the invention is in the range of about 5 to 35% and is preferably about 8 to 20%.

The detergent paste of the invention may also advantageously include amounts up to about 8%, say, for example, 0.01, 0.2, 1, 3 and 5%, of conventional functional or aesthetic adjuvants, the total amount of such adjuvants not exceeding 20% (0 to 20%), preferably 5 to 15%, e.g., 7 to 10%.

An especially important adjuvant which may be present in the paste is an organic anti-redeposition agent such as alkali metal carboxymethyl cellulose, e.g., sodium carboxymethyl cellulose, polyvinyl alcohol, hydroxymethyl ethyl cellulose, polyvinyl pyrrolidone, polyacrylamide, hydroxypropyl ethyl cellulose or mixtures thereof. Preferably the gum anti-redeposition agent is sodium carboxymethyl cellulose, which is advantageously incorporated at a concentration of up to about 3%, such as 0.2 to 2%, preferably 0.2 to 0.5%.

Another typical class of minor adjuvants which may be incorporated in the paste detergent are colorants, e.g., pigments, dyes and optical brighteners.

The colorants used may be inorganic pigments such as Ultramarine Blue, organic pigments such as beta-chlorophyll or organic dyes such as Color Index Direct Blue 1.

The optical brighteners used are fluorescent dyes including coumarins, triazolyl stilbenes, stilbene cyanurics, acylamino stilbenes or miscellaneous types such as shown in U.S. Pat. Nos. 2,911,415 and 3,031,460. The concentration of brightener is advantageously in the range of about 0.05% to 1%, e.g., 1/10% to ½%. One suitable combination of brighteners includes a naphthotriazole stilbene sulfonate brightener, sodium 2-sulfo-4 (2-naphtho-1,2-triazolyl) stilbene; another stilbene brightener, bis-(anilino diethanolamino triazinyl) stilbene disulfonic acid; another stilbene brightener, sodium bis(anilino morpholino triazinyl) stilbene disulfonate; and an oxazole brightener, having a 1-phenyl 2-benzoxazole ethylene structure, 2-styryl naphtha [1, 2 d] oxazole, in the relative proportions of about 1:1:3:1.2.

Another minor adjuvant used may be a foam stabilizer such as an alkanolamide. Such alkanolamide is a higher fatty acid lower mono- or dialkanolamide or the condensation product thereof with a lower alkylene oxide of the type described above when discussing nonionic detergents. The fatty acid or acyl portion of the alkanolamide contains from 8 to 16, preferably 10 to 16 carbon atoms. For example, the acyl portion may be derived from lauric acid, myristic acid or coconut oil fatty acids or a mixture of these. The lower alkanol portion of the alkanolamide is of 2 to 3 carbon atoms and can be derived from ethanol, isopropanol and n-propanol, in that order of preference with the monoalkanolamides, ethoxylated or not, being preferred. The alkanolamide-alkylene oxide condensates which are more preferably employed as foam stabilizers can contain from 1 to 50 alkylene oxide residues per molecule, preferably 1 to 10, more preferably 1 to 6 and most preferably 4 to 5.

An organic solubilizing agent such as urea or a water soluble surface active lower alkyl benzene sulfonate salt may also be incorporated in the paste as a functional adjuvant. Such agents not only aid in solubilizing the other ingredients of the composition but also may desirably modify the viscosity of the paste and often may act as thinning agents. The lower alkyl benzene sulfonate salt solubilizing agents contain 1 to 3, preferably 1 to 2 lower alkyl substituents in the benzene nucleus, the lower alkyl substituents being exemplified by methyl, ethyl, n-propyl,isopropyl and isobutyl groups. The cation associated with the lower alkyl benzene sulfonate solubilizing agent is similar to those discussed above for use with water soluble anionic detergents and preferably is alkali metal or ammonium with sodium and ammonium, being especially preferred.

When the detergent paste is used for washing by hand it is advantageous to include a skin protection or conditioning agent as an adjuvant, such as a material which increases the mildness of the detergent composition to human hands. Of such compounds the water soluble proteins are highly preferred. Such materials are low molecular weight polypeptides obtained by hydrolysis of protein materials such as animal hair, hides, gelatin, collagen and the like. A particularly preferred water soluble enzyme is made by hydrolysis of pork protein. During hydrolysis the proteins are gradually broken down into their constituent polypeptides and acids by prolonged heating with mineral acid or alkali or by treatment with enzymes, e.g., peptidases. During hydrolysis products made are converted progressively to simpler peptides, e.g., tripeptides, dipeptides, and finally to amino acids. The polypeptides derived from proteins are complex mixtures and in practice the average molecular weight of the hydrolysate will vary from 120 (amino acids) to about 20,000. The satisfactory hydrolyzed polypeptides are characterized by water solubility. In compositions containing soluble protein it is often preferred to employ hydrolyzed collagen of such low molecular weight as to be completely soluble in water, non-gelling (exhibiting zero Bloom value) and non-denaturing, with an average molecular weight below 15,000, preferably in the range of about 500 to 10,000.

Other important functional or aesthetic adjuvants for the detergent pastes include enzymes, e.g., proteases, amylases; foam destroyers, e.g. silicones; fabric softeners, e.g., ethoxylated lanolin; bactericides, e.g., tetrachlorosalicylanilide, hexachlorophene, trichlorocarbanilide; thickeners, e.g., starches, gums, alginates, cellulose derivatives; opacifying agents, e.g., behenic acid, polystyrene suspensions, castor wax; buffering agents, e.g., alkali borates, acetates, bisulfates; and perfumes.

The detergent pastes are "fluids" which retain their activity and homogeneity over a long shelf life, e.g., over a year. Their fluidity makes them feasible to measure or meter. They can be employed as industrial or household detergents, for example for washing dishes, but are preferably used for washing clothes, especially in automatic washing machines. In laundering clothing in automatic washing machines the amount of detergent paste which is used in the wash water will, of course, vary somewhat depending on the type of washing equipment used. In general however, only a relatively small concentration of the paste detergent in the wash water, amounting to 0.1 to 0.3%, preferably about 0.15%, is used for a full tub of wash (4 to 15 lbs.) employing either a top loading (vertical axis agitator type) or front loading (horizontal tumbling drum type) washing machine, in which the water volume is from 5 to 20 gallons, usually from 15 to 18 gallons. A concentration of as little as about 0.07 to 0.2% of the detergent in the wash water may be employed for front loading machines. For "European" washing machines, which use less water, the paste concentration may increase to 2 to 3 times that which is normal for top loading machines.

The paste detergent composition of the invention is highly effective in washing clothes, even in very hard waters (over 150 p.p.m. or greater hardness, as $CaCl_3$) but preferably a moderately soft water is used with a hardness less than 150 p.p.m., preferably of 25 to 100 p.p.m. While the washing temperature employed with the present paste detergent can range from 10° to 90° C., preferably it is from about 20° to 70° C. The washing is usually followed by rinsing and spinning or other draining or wringing cycles or operations, which are preferably automatic. Of course, the present paste detergent may also be used for manual washing of laundry. In such instances it may be used full strength or certain stains or heavy soils or the laundry may be soaked in wash water containing a higher than normal concentration of the detergent prior to normal machine washing. The washing operations will generally take from 3 minutes to one hour, depending on the fabrics being washed and the degrees of soiling of the clothing. After completion of the washing and the spinning, draining or wringing operations it is preferred to dry the laundry in an automatic dryer soon thereafter but line drying may also be used. A fabric softener rinse may be interposed between washing and drying or at another suitable stage in the laundering or drying process.

The molecular sieve zeolite-containing detergent pastes of the invention have been found to be effective detergents to remove a wide variety of soils, including clay and carbon soils, skin soils, natural and artificial sebum soils, fatty soils, proteinaceous soils and especially, particulate soils from a variety of fabrics, including cotton, nylon, polyester, such as polyethylene terephthalate, cotton-polyester blends, cotton-nylon blends and nylon-rayon-cotton blends.

Even when devoid of a conventional builder salt ingredient, the present paste compositions are highly effective detergents due to the excellent detergency building effect of the molecular sieve zeolite ingredient. The molecular sieve zeolite components are highly efficient in sequestering calcium ion and preventing detergent precipitation, as is illustrated by their aforementioned excellent performance in laundering operations carried out with waters of high calcium hardness. The silicate builder component helps to counteract any magnesium hardness in the water and the silicate is more stable in the paste products than in liquids. Surprisingly, the paste form of the detergent composition containing the molecular sieve zeolite is capable of removing calcium ion from the wash water in cold water washing faster than is the case for spray dried products of similar formulation.

The zeolite sieve gives desired body to the detergent preventing it from being too soft, and allows the incorporation of larger quantities of various ingredients that would not be stable in liquids and would settle out in them, e.g., silicates. The paste form is also often aesthetically preferable.

On washing of fabrics with the present paste detergent only slight, almost unnoticeable deposits of insolubles remain on the fabric after rinsing, even in the absence of an anti-redeposition agent and in the absence of machine drying. It was surprising to discover this excellent anti-redeposition characteristic of the present detergent in view of the known water insolubility of the molecular sieve zeolite component of the detergent paste and the quantity thereof present. When automatic drying is employed the washed laundry does not even have a noticeable deposit of molecular sieve on it. Also, white fabrics washed with the present surfactant mixtures in the presence of colored fabrics are not stained by dyes fugitive from the colored fabrics when ordinary washing and drying methods are employed.

Thus, the present paste detergents can be made in stable paste form, without the need for phosphate builder salts and the molecular sieves used as primary builders to counteract calcium hardness, also tie up water in the paste and contribute significantly to making the paste or gel and stabilizing it on storage.

The following examples illustrate the invention but do not limit it. Unless otherwise indicated, all parts are by weight and temperatures are in °C.

EXAMPLE 1

| | % |
|---|---|
| Nonionic detergent[1] | 15 |
| Sodium silicate[2] | 15 |
| Molecular sieve zeolite[3] | 25 |
| Sodium carboxymethyl cellulose | 0.5 |
| Deionized water | 44.5 |
| | 100.0 |

[1]Neodol 25-7 $C_{12-15}$ linear primary alcohol ethoxylate containing on the average 7 ethylene oxide residues per molecule (Shell Chemical Co.)
[2]$Na_2O:SiO_2$ = 1:2.35
[3]Sodium aluminosilicate having type A crystalline structure, a nominal pore size of 4 Angstroms, an average particle diameter of 6.4 microns, and a moisture content of about 21% (percentages of molecular sieve zeolites given in this and the following examples are on an anhydrous basis) manufactured by Henkel & Cie.

The components are admixed and then mixed for about 5 minutes at room temperature (25° C.). The resulting mixture is a stable homogenous fluid paste which can be extruded easily. When tested at a wash water concentration of about 0.1.5% in an automatic washing machine the paste exhibits an excellent detersive effect against clay and carbon soils, skin soil, natural and artificial sebum soils and especially particulate soils on cotton, nylon, polyester and cotton-polyester blend fabrics.

The detergent paste is tested for detersive effects toward particulate soils against a commercial liquid detergent, conventional laboratory and practical laundry mixed soil tests.

The differences between the soil removal index value for the present paste and that for the commercial liquid detergent indicate a superior detersive effect of the present detergent especially against particulate soils.

Substantially the same type of excellent results is obtained when the molecular sieve zeolite is replaced in the formula given by a molecular sieve zeolite having a type A crystalline structure, an average por size of 8 Angstroms, nominal an average particle size of 8.3 microns and a moisture content of 21% (Linde Type 4A molecular sieve, manufactured by Union Carbide Corp. and tested in hot (50° C.) and cold (20° C.) waters.

EXAMPLE 2

| | % |
|---|---|
| Nonionic detergent (as in Example 1) | 16 |
| Sodium silicate (as in Example 1) | 12 |
| Molecular sieve zeolite (as in Example 1) | 24 |
| Deionized water | 48 |
| | 100.0 |

The above materials are mixed together substantially as described in Example 1. There is obtained a paste having an excellent homogeneity, "fluidity" and detersive effect similar to that of the product of Example 1. When the paste is comparatively tested against a liquid detergent (product) according to a standard mixed soil testing procedure, as in Example 1, it receives an excellent rating for particulate soil removal, substantially similar to that achieved by the Example 1 product. This is also the case when the nonionic detergent is replaced by Neodol 45-11, Ifonic 1618-65 and Igepal CO-630, at least to the extent of 50% replacement. A good, stable product also results when half the silicate is replaced with sodium carbonate, pentasodium tripolyphosphate or trisodium nitrilotriacetate or a mixture thereof in equal parts.

EXAMPLE 3

| | % |
|---|---|
| Nonionic detergent (as in Example 1) | 33.1 |
| Sodium silicate (as in Example 1) | 11.1 |
| Molecular sieve zeolite (as in Example 1) | 30.6 |
| Sodium carboxymethyl cellulose | 0.2 |
| Deionized water | 25 |
| | 100.0 |

The procedure of Example 1 is utilized to prepare a homogeneous stable paste of the above formula which exhibits excellent detersive effects against various type of soils in practical laundry tests in home laundry top and front loading automatic washing machines at 0.2 and 0.1% concentrations respectively (water hardness of 150 p.p.m., as $CaCO_3$, 60% of which is calcium hardness and 40% of which is magnesium hardness).

Anti-redeposition is improved by the presence of the CMC and is further bettered by an increase thereof to 0.5%. Polyvinyl alcohol, when substituted for the CMC, is also effective as an anti-redeposition agent. Both CMC and PVA help to strengthen the gel or paste made. Tap water can be substituted for the deionized water. Also, other molecular sieve zeolites of $Al_2O_3$:$SiO_2$ molar ratios of 1:1 to 1:4 may be used successfully.

EXAMPLE 4

| | % |
|---|---|
| Nonionic detergent (as in Example 1) | 43.5 |
| Molecular sieve zeolite (as in Example 1) | 44.5 |
| Deionized water | 12.0 |
| | 100.0 |

The procedure of Example 1 is utilized to prepare a useful detergent paste from the above ingredients. The product exhibits an excellent detersive effect and is especially good for hand and machine washing and for lighter duty detergent applications.

EXAMPLE 5

| | % |
|---|---|
| Nonionic detergent (as in Example 1) | 24 |
| Sodium silicate (as in Example 1) | 8 |
| Molecular sieve zeolite (as in Example 1) | 24 |
| Sodium carboxymethyl cellulose | 0.2 |
| Deionized water | 34.7 |
| Anionic detergent[4] | 9.1 |

[4]Linear sodium dodecyl benzene sulfonate.

The above materials are made into a paste in accordance with the procedure of Example 1. There is obtained a stable homogeneous paste detergent which is excellent for laundering soiled clothing in automatic washing machines but is also suitable for hand laundering. The presence of the anionic detergent improves the cleaning power of the detergent paste and the physical form.

In the above examples the proportions of components are changed within the ranges previously given and good paste detergents are made. Also the various molecular sieves (Types X, Y, L, chabazite, erionite and mordenite), detergents, builder salts and adjuvants are substituted and added, within the limits given and good, stable, convenient to use products are the results. Such pastes require little energy for their manufacture, are non-polluting (when phosphates are avoided) and are made by a simple non-polluting process. They are concentrated and easy to use. Best of all, the products are effective cleaners and do not deposit objectionably on the laundry.

The invention has been described with respect to working examples and illustrations thereof but is not to be limited to these because it is evident that one of skill in the art with access to the present specification will be able to employ substituents and equivalents without departing from the spirit or scope of the invention.

What is claimed is:

1. A stable, homogeneous paste detergent comprising:

(a) about 24% of a synthetic nonionic detergent formed by the condensation of a linear $C_{12}$–$C_{15}$ primary alcohol with about 7 ethylene oxide residues;

(b) about 8% of sodium silicate having an $Na_2O:SiO_2$ ratio of about 1:2.35;

(c) about 24% by weight based on the anhydrous weight of a type A zeolite having a moisture content of about 21% and an average particle diameter of 6.4 microns;

(d) about 0.2% of sodium carboxymethyl cellulose;

(e) about 34.7% of deionized water; and (f) about 9.1% of linear sodium dodecyl benzene sulfonate.

* * * * *